(12) United States Patent
Breeze-Stringfellow et al.

(10) Patent No.: US 11,352,132 B2
(45) Date of Patent: Jun. 7, 2022

(54) LIFT FAN WITH DIFFUSER DUCT

(71) Applicant: General Electric Company, Schenectady, NY (US)

(72) Inventors: Andrew Breeze-Stringfellow, Montgomery, OH (US); Daniel Lawrence Tweedt, West Chester, OH (US); Syed Arif Khalid, West Chester, OH (US); Kurt David Murrow, Liberty Township, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 146 days.

(21) Appl. No.: 16/042,141

(22) Filed: Jul. 23, 2018

(65) Prior Publication Data
US 2020/0023959 A1    Jan. 23, 2020

(51) Int. Cl.
*B64C 11/00*    (2006.01)
*B64C 29/00*    (2006.01)

(52) U.S. Cl.
CPC ........ *B64C 29/0025* (2013.01); *B64C 11/001* (2013.01)

(58) Field of Classification Search
CPC .... F04D 29/541; F04D 29/542; F04D 29/544; F04D 29/545; F04D 29/547; F05D 2240/12; F05D 2240/126; F05B 2240/12; F05B 2240/121; B64C 11/001; B64C 27/20; B64C 29/0025; B64C 39/062; B64C 39/064
See application file for complete search history.

(56) References Cited

U.S. PATENT DOCUMENTS

| | | | | |
|---|---|---|---|---|
| 2,330,907 A | * | 10/1943 | Dodge | B64C 11/001 415/185 |
| 2,922,277 A | * | 1/1960 | Bertin | B64C 23/005 244/12.2 |
| 2,929,580 A | | 3/1960 | Ciolkosz | |
| 2,953,320 A | * | 9/1960 | Parry | B64C 27/20 244/12.2 |
| 3,013,744 A | | 12/1961 | Klapproth | |

(Continued)

FOREIGN PATENT DOCUMENTS

FR    73117    9/1960

OTHER PUBLICATIONS

Extended European Search Report issued for related EP Application No. 19187775.2 dated Dec. 11, 2019.

*Primary Examiner* — Joseph W Sanderson
(74) *Attorney, Agent, or Firm* — Fitch, Even, Tabin & Flannery LLP

(57) ABSTRACT

A lift fan apparatus includes: a rotor having at least one rotatable hub carrying at least one row of blades; a duct surrounding the rotor, the duct including spaced-apart peripheral walls extending between an inlet and an exit, the peripheral walls collectively defining a flow channel which includes a diffuser disposed downstream of the rotor, in which a flow area at the exit is greater than a flow area at the rotor; and a plurality of spaced-apart splitters disposed in the diffuser, each of the splitters having opposed side walls extending between an upstream leading edge and a downstream trailing edge, wherein the splitters divide the diffuser into a plurality of side-by-side flow passages.

18 Claims, 4 Drawing Sheets

(56) References Cited

U.S. PATENT DOCUMENTS

| | | | | |
|---|---|---|---|---|
| 3,045,947 | A * | 7/1962 | Bertin | B64C 23/005 |
| | | | | 244/12.1 |
| 3,054,578 | A * | 9/1962 | Brocard | B64C 27/20 |
| | | | | 244/23 C |
| 3,170,530 | A | 2/1965 | Black | |
| 3,230,702 | A * | 1/1966 | Soulez-Lariviere | B22D 33/00 |
| | | | | 60/263 |
| 3,819,134 | A | 6/1974 | Throndson | |
| 3,846,039 | A * | 11/1974 | Stalker | F04D 21/00 |
| | | | | 415/206 |
| 4,075,500 | A * | 2/1978 | Oman | F03D 7/02 |
| | | | | 290/55 |
| 4,634,342 | A * | 1/1987 | Rodewald | F04D 29/545 |
| | | | | 239/77 |
| 4,796,836 | A | 1/1989 | Buchelt | |
| 4,815,942 | A | 3/1989 | Alperin et al. | |
| 5,035,377 | A | 7/1991 | Buchelt | |
| 5,077,967 | A * | 1/1992 | Widener | F23R 3/04 |
| | | | | 415/208.1 |
| 5,407,150 | A | 4/1995 | Sadleir | |
| 5,592,820 | A * | 1/1997 | Alary | F01D 9/02 |
| | | | | 60/751 |
| 7,249,732 | B2 | 7/2007 | Sanders et al. | |
| 7,488,154 | B2 * | 2/2009 | Wiedermann | F02C 7/04 |
| | | | | 415/205 |
| 8,894,288 | B2 | 11/2014 | Pisani et al. | |
| 9,291,177 | B2 * | 3/2016 | Wurz | F04D 29/541 |
| 9,694,907 | B2 | 7/2017 | Simon et al. | |
| 9,945,391 | B2 * | 4/2018 | Hausmann | F04D 19/002 |
| 10,072,671 | B2 * | 9/2018 | Engert | F04D 29/547 |
| 10,197,070 | B2 * | 2/2019 | Stephan | F04D 19/002 |
| 10,221,861 | B2 * | 3/2019 | Avedon | F04D 13/06 |
| 2010/0166554 | A1 * | 7/2010 | Dierksmeier | B64C 29/0025 |
| | | | | 415/220 |
| 2011/0274533 | A1 * | 11/2011 | Presz, Jr. | F03D 1/0633 |
| | | | | 415/1 |
| 2013/0265848 | A1 * | 10/2013 | Wurz | F04D 29/545 |
| | | | | 366/337 |
| 2014/0086728 | A1 * | 3/2014 | Engert | F04D 29/541 |
| | | | | 415/119 |
| 2014/0151494 | A1 | 6/2014 | Cvrlje | |
| 2015/0275918 | A1 * | 10/2015 | Hausmann | F04D 29/542 |
| | | | | 415/1 |
| 2015/0300372 | A1 * | 10/2015 | Stephan | F04D 25/166 |
| | | | | 415/207 |
| 2015/0354578 | A1 * | 12/2015 | Avedon | F04D 13/06 |
| | | | | 417/53 |
| 2019/0023390 | A1 * | 1/2019 | Murrow | B64D 27/08 |
| 2019/0047680 | A1 * | 2/2019 | Murrow | B64C 3/32 |
| 2019/0047681 | A1 * | 2/2019 | Murrow | B64D 31/06 |
| 2019/0047716 | A1 * | 2/2019 | Murrow | B64D 35/02 |

* cited by examiner

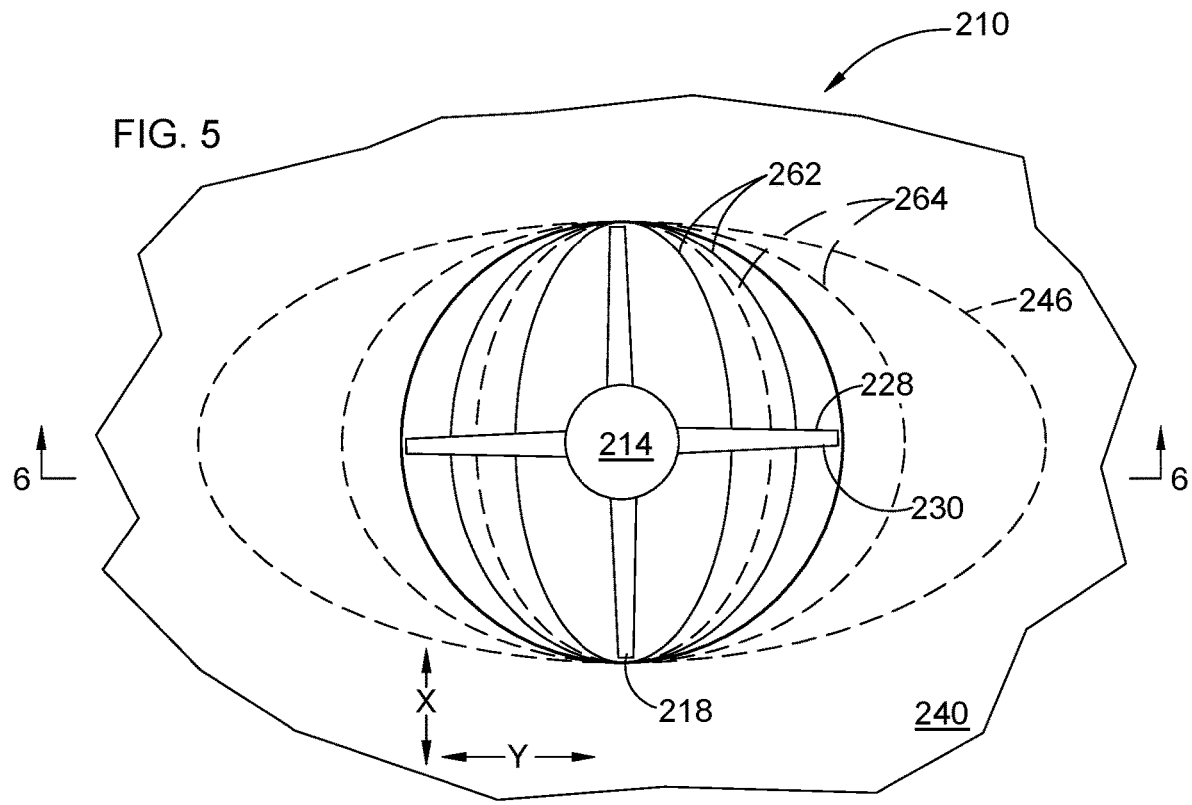
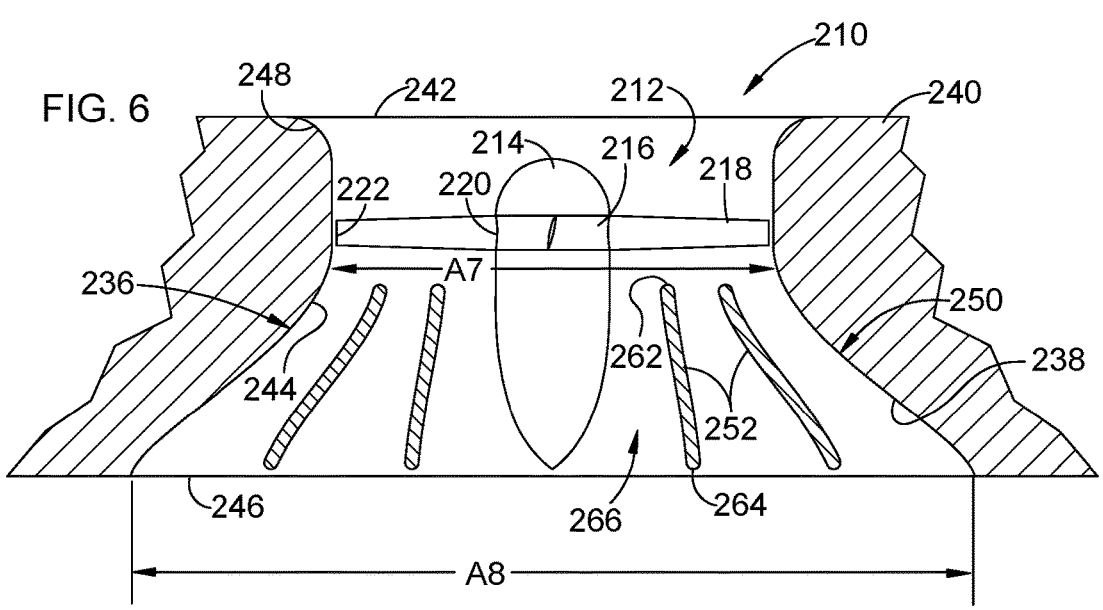

LIFT FAN WITH DIFFUSER DUCT

BACKGROUND OF THE INVENTION

This invention relates generally to vehicle propulsion, and more specifically to lift fans.

Propellers and fans are commonly used to provide propulsion for aircraft. A fan includes a number of airfoil-shaped blades attached to a hub which is rotated by a prime mover in order to generate thrust.

There is a desire to produce aircraft capable of multiple modes of flight including vertical takeoff, hovering, and conventional flight at high subsonic speeds. Such aircraft typically include fixed wings in addition to or more direct lift or powered lift devices which produce thrust directed in a downward direction, generating a lift force at low or zero forward horizontal velocity.

Various direct lift or powered lift means are known, e.g. lift fans or hover fans. Good efficiency in hover is achieved by generating thrust with a large volume of airflow accelerated by a small velocity delta, as in a helicopter. One problem with existing lift fans is that it is difficult to provide a lift fan with adequate performance and efficiency in a compact package.

BRIEF DESCRIPTION OF THE INVENTION

This problem is addressed by the technology described herein, which provides a lift fan for a vehicle including a duct incorporating a diffuser.

According to one aspect of the technology described herein, a lift fan apparatus includes: a rotor having at least one rotatable hub carrying at least one row of blades; a duct surrounding the rotor, the duct including spaced-apart peripheral walls extending between an inlet and an exit, the peripheral walls collectively defining a flow channel which includes a diffuser disposed downstream of the rotor, in which a flow area at the exit is greater than a flow area at the rotor; and a plurality of spaced-apart splitters disposed in the diffuser, each of the splitters having opposed side walls extending between an upstream leading edge and a downstream trailing edge, wherein the splitters divide the diffuser into a plurality of side-by-side flow passages.

According to another aspect of the technology described herein, a lift fan apparatus includes: a vehicle structure; a duct disposed in the vehicle structure, the duct including spaced-apart peripheral walls extending between an inlet and an exit, the peripheral walls collectively defining a flow channel which includes a diffuser communicating with the exit; a rotor mounted in the duct upstream of the diffuser, the rotor having at least one rotatable hub carrying at least one row of blades; a prime mover coupled in driving relationship with the hub; and a plurality of spaced-apart splitters disposed in the diffuser, each of the splitters having opposed side walls extending between an upstream leading edge and a downstream trailing edge, wherein the splitters divide the diffuser into a plurality of side-by-side flow passages.

BRIEF DESCRIPTION OF THE DRAWINGS

The invention may be best understood by reference to the following description taken in conjunction with the accompanying drawing figures in which:

FIG. 5 is a schematic top plan view of an alternative lift fan;

FIG. 6 is a cross-sectional view taken along lines 6-6 of FIG. 5;

DETAILED DESCRIPTION OF THE INVENTION

Figure 1:
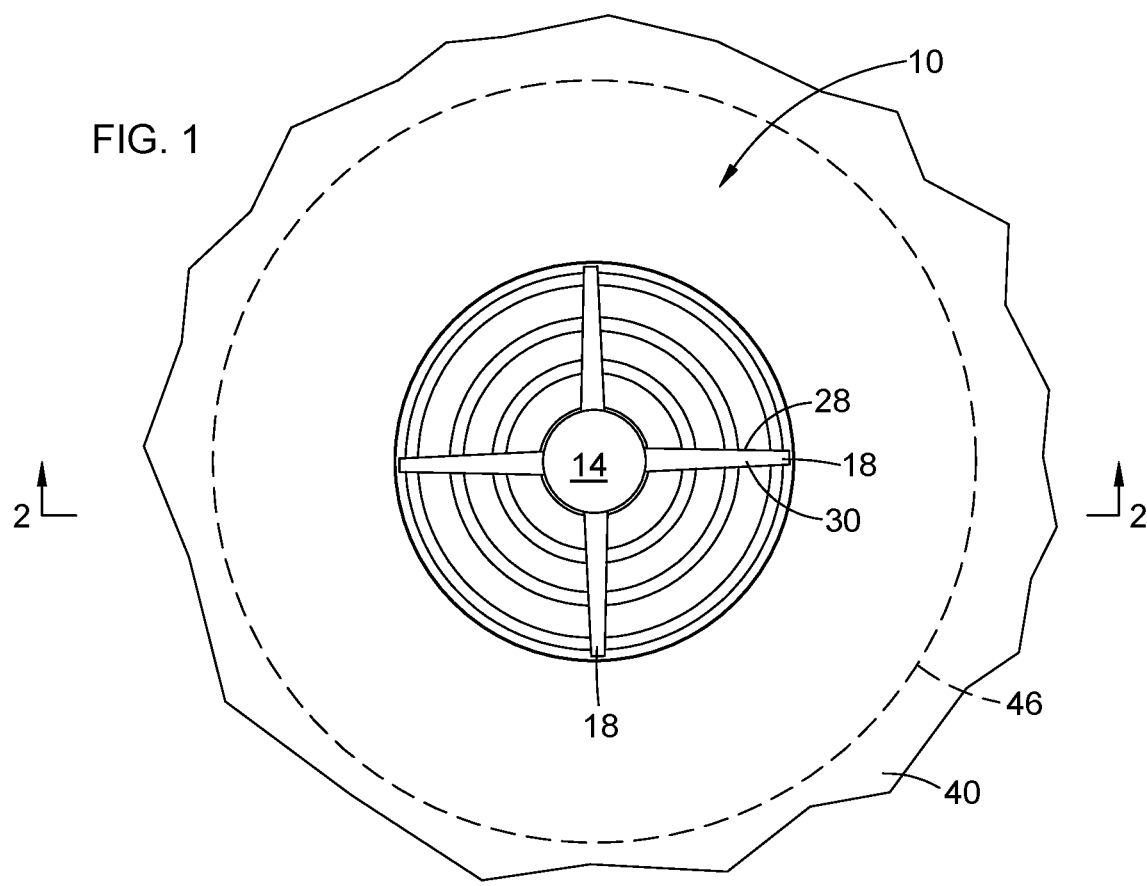
FIG. 1 is a schematic top plan view of an exemplary lift fan.

Referring to the drawings wherein identical reference numerals denote the same elements throughout the various views, FIG. 1 depicts an exemplary lift fan 10. As used herein, the term "lift fan" refers to a thrust-producing structure which is suitable for providing direct lift of the vehicle or similar purposes. This may alternatively be referred to herein as a "hover fan". It will be understood that the principles described herein are equally applicable to fans which merely provide supplemental lift or maneuvering control, as well as fans capable of providing sufficient thrust to allow a vehicle to hover and/or climb. In the illustrated example, the lift fan 10 includes a single rotor 12.

The rotor 12 is drivingly coupled to a prime mover 14 which may be any device operable to rotate the rotor 12 at the required speed under expected mechanical and aerodynamic loads. Nonlimiting examples of prime movers include heat engines, motors (e.g. electric, hydraulic, or pneumatic), or combinations thereof (for example electric hybrid drive-trains). In one example, the prime mover 14 may comprise a gas turbine engine including, in axial flow sequence, a compressor, a combustor, and one or more turbines. The rotor 12 may be driven directly by the prime mover 14, or through an intermediate means such as a geartrain, or by bleed air from a prime mover (e.g. using a tip turbine).

The rotor 12 comprises a hub or disk 16 having a plurality of blades 18 extending therefrom. Each blade 18 extends from a root 20 at the hub 16 to a tip 22 and includes a generally concave pressure side joined to a generally convex suction side at a leading edge 28 and a trailing edge 30. Each blade 18 has a span (or span dimension) defined as the radial distance from the root 20 to the tip 22, and every airfoil section thereof has a chord (or chord dimension) defined as the length of an imaginary straight line, referred to as a "chord line", connecting the leading edge 28 and the trailing edge 30. The blades 18 can be uniformly or non-uniformly spaced apart around the periphery of the hub 16. The illustrated example shows a single rotor 12. Optionally, the lift fan 10 could include features such as multiple rotor stages (either co-rotating or counter-rotating) and/or stationary stator airfoils, positioned upstream and/or downstream of the rotating blades 18.

In operation, the hub 16 rotates about a central axis 32, and the blades 18 sweep through a rotor plane 34 which is perpendicular to the central axis 32. Airfoil sections of the blades 18 are each disposed at some pitch angle, dependent on radius (the blades 18 may incorporate twist) and measured between the blade's chord line and the rotor plane 34. The blades 18 may have a "fixed pitch" configuration in which the airfoil section pitch angles of the blades 18 cannot be changed. Alternatively, the blades 18 may have a "variable pitch" configuration in which the airfoil section pitch angles of the blades 18 may be uniformly varied (i.e. same pitch angle change for all airfoil sections) in flight. A variable-pitch rotor may be used to provide thrust efficiently in varying flight conditions. One or more conventional pitch change actuators (not shown) may be used to effect pitch changes.

Figure 2:
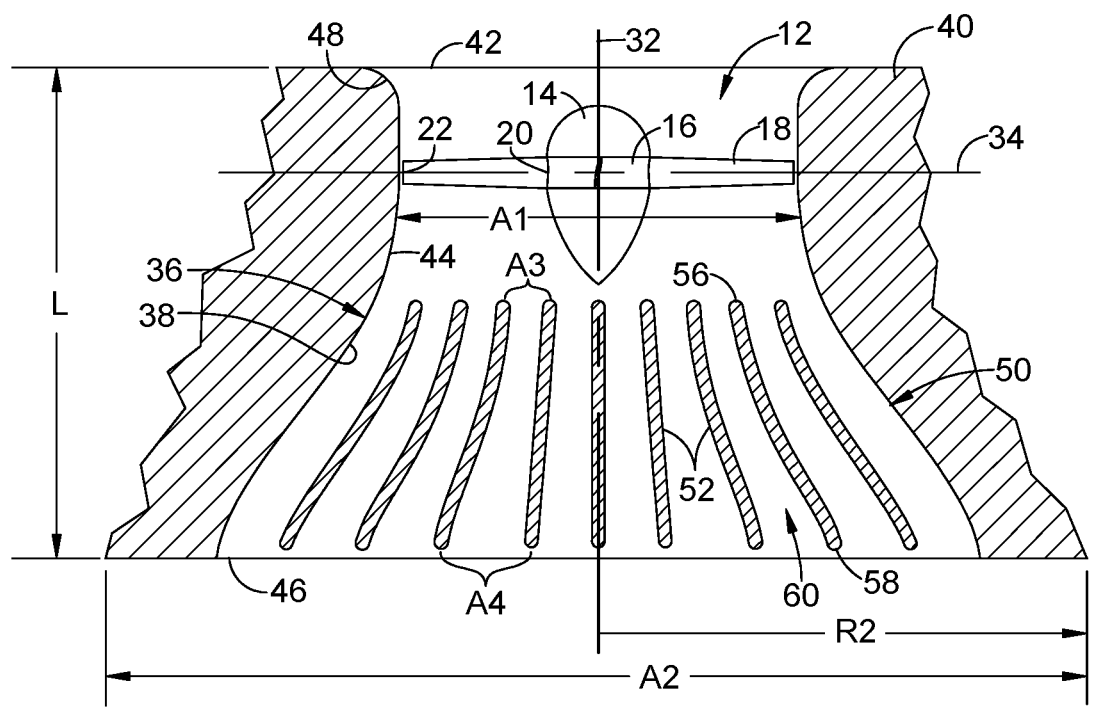
FIG. 2 is a cross-sectional view taken along lines 2-2 of FIG. 1.

The rotor is disposed in a duct 36, bounded by peripheral wall surfaces 38. The peripheral wall surfaces 38 are part of a vehicle structure 40 which is shown in fragmentary view in FIG. 2. In the illustrated example, the peripheral wall surfaces 38 are a body of revolution and may alternately be described as a single annular peripheral wall.

The duct 36 includes, in downstream flow sequence, an inlet 42, a mid-section 44, and an exit 46.

The inlet 42 is configured (i.e. shaped and sized) to introduce airflow into the duct 36 with minimal pressure loss and flow disturbance. In the illustrated example, the inlet includes a convex-radiused lip 48 for the purpose of enhancing flow turning into the duct 36.

The rotor 12 is positioned within the mid-section 44. The mid-section 44 has a shape which closely surrounds the tips 22 of the blades 18 to minimize flow leakage. The mid-section 44 may be of constant area or may have an area which increases or decreases from its upstream end to its downstream end. The mid-section 44 may have a shape which is curved or otherwise contoured to closely conform to the blade tips 22. Optionally, the mid-section 44 may include a sacrificial or abradable element (not shown) to accommodate "rubs" or other minor contact of the blade tips 22.

The duct 36 incorporates a diffuser 50 positioned downstream of the rotor 12. In the illustrated example, the duct 36 has a flow area "A1" measured within the mid-section 44 immediately downstream of the rotor 12, and a flow area "A2" measured at the exit 46. For reference purposes, the flow area A1 may be described as the flow area "at the rotor". The flow area A2 is greater than the flow area A1, thus defining the diffuser 50. The ratio of the flow areas A2/A1 ("diffusion ratio") and the axial or streamwise rate of change between the two, that is, the profile shape of the peripheral wall surfaces ("diffusion rate"), may be selected to suit a specific application. In one example, the flow area A2 could be at least 50% greater than the flow area A1. In another example, the flow area A2 could be at least 100% greater than the flow area A1. In the illustrated example, the duct 36 is axisymmetrical about the central axis 32. However, it will be understood that the duct 36 could be asymmetrical, or it could be symmetrical about an arbitrary plane, or an axis other than the central axis 32.

Is generally desirable to make an overall flow length "L" of the duct 36 measured from the inlet 42 to the exit 46 as short as possible, for the purpose of overall compactness and ease of incorporation into the vehicle structure 40. However, a large rate of change in the area over a short length of a duct can cause problems such as flow separation. It has been discovered that the overall length L can be made shorter than would otherwise be required, while avoiding flow separation, by the incorporation of splitters into the diffuser 50.

In the illustrated example, a plurality of spaced-apart splitters 52 are disposed in the duct 36. Each of the splitters 52 has opposed side walls extending between a leading edge 56 and a trailing edge 58. The splitters 52 subdivide the duct 36 into a plurality of generally parallel flow passages 60. The splitters 52 may be annular structures configured as concentric rings as shown, or could extend along a straight line, or follow some curvilinear shape. In the illustrated example, the splitters 52 would be provided with some exterior support (not shown) such as struts or brackets connecting them to the peripheral wall 38. Alternatively, the splitters 52 could derive structural support by extending all the way to the peripheral wall 38.

Each of the flow passages 60 has a flow area at its upstream end, designated "A3", and a flow area at the exit 46, designated "A4". The splitters 52 are configured such that each flow passage 60 acts as a diffuser, or stated another way, the flow area A4 is greater than the flow area A3.

The flow passages 60 may be configured so as to have similar or equal diffusion ratios, or stated another way, for the ratio A4/A3 to be approximately equal for each flow passage 60. It is also beneficial for reducing flow losses if the flow passages 60 are configured so as to have similar or equal diffusion rates as defined above.

The splitters 52 are shaped and sized so as to act as turning vanes, that is, to turn the flow of the first fluid in an axial-radial plane in a manner so as to prevent flow separation from the peripheral wall surfaces 38. The specific degree of flow turning will depend upon the shape of the mean line of the splitters and their angle of attack relative to the fluid flow.

Figure 3:
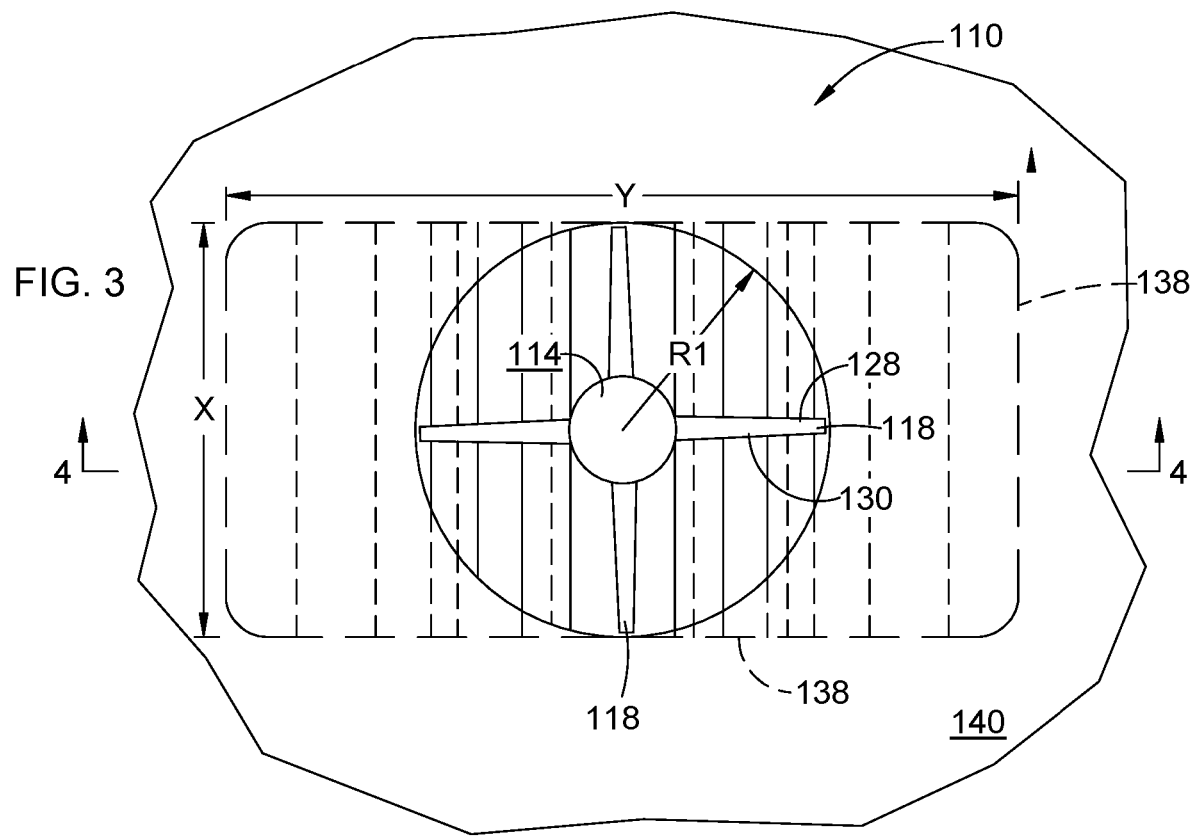
FIG. 3 is a schematic top plan view of an alternative lift fan.
Figure 4:
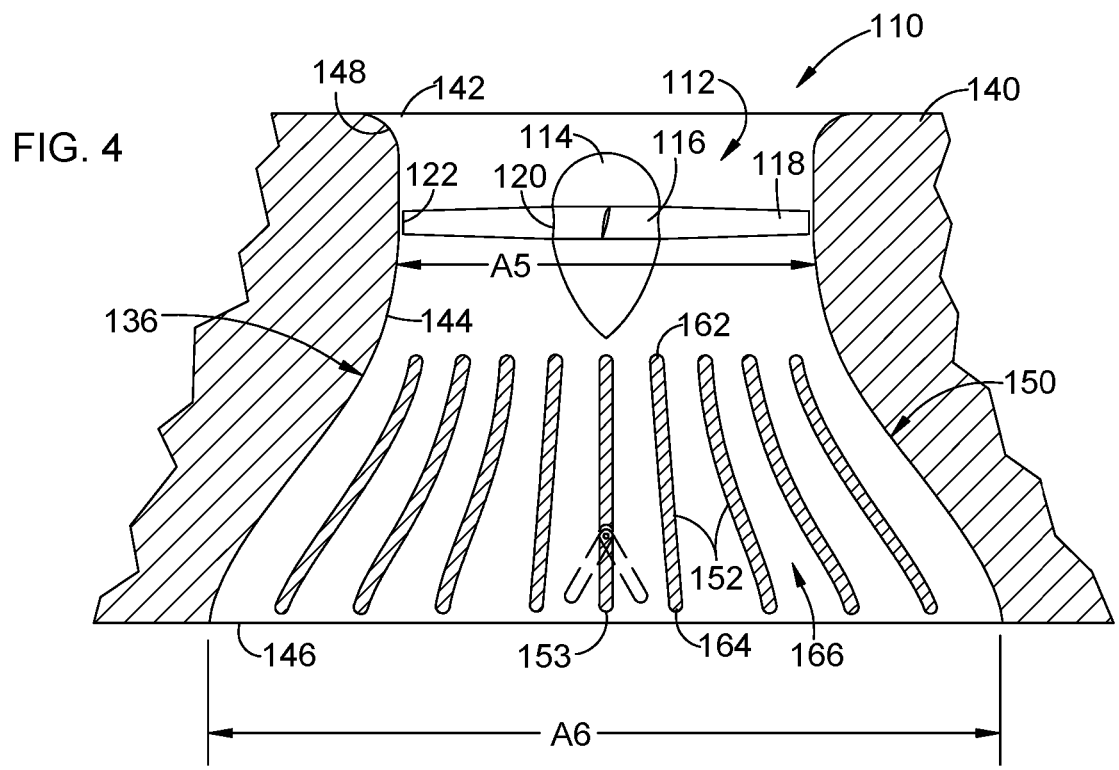
FIG. 4 is a cross-sectional view taken along lines 4-4 of FIG. 3.

FIGS. 3 and 4 illustrate an alternative lift fan 110 which is similar in general construction to the lift fan 10 described above. Elements of the lift fan 110 not specifically described may be considered to be identical to corresponding elements of the lift fan 10. The lift fan 110 includes a rotor 112 connected to a prime mover 114. The rotor 112 includes a hub or disk 116 having a plurality of blades 118 extending therefrom. Each blade 118 extends from a root 120 at the hub 116 to a tip 122 and includes opposed pressure and suction sides extending between a leading edge 128 and a trailing edge 130. The blades 118 may be fixed pitch or variable pitch.

The rotor 112 is disposed in a duct 136, bounded by peripheral wall surfaces 138. The peripheral wall surfaces 138 are part of a vehicle structure 140 which is shown in fragmentary view in FIG. 4. The duct 136 includes, in downstream flow sequence, an inlet 142, a mid-section 144, and an exit 146.

The inlet 142 is configured (i.e. shaped and sized) to introduce airflow into the duct 136 with minimal pressure loss in flow disturbance. In the illustrated example, the inlet includes a convex-radiused lip 148 for the purpose of enhancing flow turning into the duct 136.

The rotor 112 is positioned within the mid-section 144. The mid-section 144 has a shape which closely surrounds the tips 122 of the blades 118 to minimize flow leakage. In this example the mid-section 144 is a body of revolution. The mid-section 144 may be of constant flow area or may have a flow area which increases or decreases from its upstream end to its downstream end. The mid-section 144 may have a shape which is curved or otherwise contoured to closely conform to the blade tips 122 Optionally, the mid-section 144 may include a sacrificial or abradable element (not shown) to accommodate "rubs" or other minor contact of the blade tips 122.

The duct 136 incorporates a diffuser 150 positioned downstream of the rotor 112. The diffuser 150 has a flow area "A5" measured within the mid-section 144 immediately downstream of the rotor 112, and a flow area "A6" measured at the exit 146. For reference purposes, the flow area A5 may be described as the flow area "at the rotor". The diffuser ratio A6/A5 and the diffusion rate may be selected to suit a specific application. In one example, the flow area A6 could be at least 50% greater than the flow area A5. In another example, the flow area A6 could be at least 100% greater than the flow area A5.

In this embodiment, the diffuser 150 has a circular plan view (i.e., flow area) shape at an upstream end where it adjoins the mid-section 144, and transitions to a generally rectangular plan view (i.e., flow area) shape with radiused corners at the exit 146. The generally rectangular shape is an example of an elongated, non-axisymmetric shape. The generally rectangular shape at the exit 146 has a characteristic overall width dimension "X" and a characteristic overall length dimension "Y" measured perpendicular to the width dimension X. The width dimension X is approximately equal to a radius "R1" of the mid-section 144 (see FIG. 3). Given equal exit flow areas between ducts 36 and 136, the dimension X would be less than a radius "R2" of the exit 46 of the embodiment shown in FIG. 2. The length dimension Y is greater than the width dimension X. This rectangular configuration provides at least one dimension which is more compact than that of the lift fan 10 shown in FIGS. 1 and 2. This may be useful for the purpose of placing two or more lift fans 110 next to each other in close proximity while minimizing the space used within a vehicle structure.

Optionally, the duct 136 may incorporate splitters. In the example shown in FIG. 4, a plurality of spaced-apart splitters 152 are disposed in the duct 136. Each of the splitters 152 has opposed side walls extending between a leading edge 162 and a trailing edge 164. The splitters 152 subdivide the duct 36 into a plurality of generally parallel flow passages 166. In the illustrated example, the splitters 152 extend between opposed peripheral wall surfaces 138 parallel to the dimension Y described above; however, other shapes could be used.

The splitters 152 are configured such that each flow passage 166 acts as a diffuser. The flow passages 166 may be configured so as to have similar or equal diffusion ratios. The flow passages 166 may be configured so as to have similar or equal diffusion rates as defined above.

Optionally, all or a portion of the splitters 152 may be moveable. The moveable splitters or portions may be used for functions such as flow throttling or thrust vectoring. In the example shown in FIG. 4, one of the splitters 152 is shown with a pivotable flap 153 disposed adjacent the trailing edge 164. The flap 153 or other moveable component may be operated by conventional actuators (not shown).

Many shape variations are possible for the lift fan ducts. FIGS. 5-8 illustrate embodiments in which the duct has a circular inlet and an elliptical exit, with different configurations of splitters. FIGS. 5 and 6 illustrate an alternative lift fan 210 which is similar in general construction to the lift fan 10 described above. Elements of the lift fan 210 not specifically described may be considered to be identical to corresponding elements of the lift fan 10. The lift fan 210 includes a rotor 212 connected to a prime mover 214. The rotor 212 includes a hub or disk 216 having a plurality of blades 218 extending therefrom. Each blade 218 extends from a root 220 at the hub 216 to a tip 222 and includes opposed pressure and suction sides extending between a leading edge 228 and a trailing edge 230. The blades 218 may be fixed pitch or variable pitch.

The rotor 212 is disposed in a duct 236, bounded by peripheral wall surfaces 238. The peripheral wall surfaces 238 are part of a vehicle structure 240 which is shown in fragmentary view in FIG. 6. The duct 236 includes, in downstream flow sequence, an inlet 242, a mid-section 244, and an exit 246.

The inlet 242 is configured to introduce airflow into the duct 236 with minimal pressure loss in flow disturbance. In the illustrated example, the inlet includes a convex-radiused lip 248 for the purpose of enhancing flow turning into the duct 236.

The rotor 212 is positioned within the mid-section 244. The mid-section 244 has a shape which closely surrounds the tips 222 of the blades 218 to minimize flow leakage. In this example the mid-section 244 is a body of revolution. The mid-section 144 may be of constant flow area or may have a flow area which increases or decreases from its upstream end to its downstream end. The mid-section 244 may have a shape which is curved or otherwise contoured to closely conform to the blade tips 222. Optionally, the mid-section 244 may include a sacrificial or abradable element (not shown) to accommodate "rubs" or other minor contact of the blade tips 222.

The duct 236 incorporates a diffuser 250 positioned downstream of the rotor 212. The diffuser 250 has a flow area "A7" measured within the mid-section 244 immediately downstream of the rotor 212, and a flow area "A8" measured at the exit 246. For reference purposes, the flow area A7 may be described as the flow area "at the rotor". The diffusion ratio of the flow areas A8/A7 and the diffusion rate may be selected to suit a specific application. In one example, the flow area A8 could be at least 50% greater than the flow area A7. In another example, the flow area A8 could be at least 100% greater than the flow area A7.

In this embodiment, the diffuser 250 has a circular plan view (i.e., flow area) shape at an upstream end where it adjoins the mid-section 244, and transitions at the exit 246 to a plan view (i.e., flow area) shape which is an elongated, non-axisymmetric shape. In this example the shape is an ellipse.

Optionally, the duct 236 may incorporate splitters. In the example shown in FIG. 6, a plurality of spaced-apart splitters 252 are disposed in the duct 236. Each of the splitters 252 has opposed side walls extending between a leading edge 262 and a trailing edge 264. The splitters 252 are generally annular and subdivide the duct 236 into a plurality of generally parallel, generally annular flow passages 266. The splitters 252 may smoothly transition or "morph" from one shape to another. In the illustrated example, one or more of the individual splitters 252 has a shape which transitions or morphs from an ellipse with a first orientation having a longer dimension (i.e. major axis) parallel to a first direction "X" at the leading edge 262, to an ellipse with a second orientation having a longer dimension (i.e. major axis) parallel to a second direction "Y" at the trailing edge 264. For simplicity of illustration, only the leading and trailing edges 262, 264 of the splitters 252 are depicted in FIG. 5.

The splitters 252 are configured such that each flow passage 266 acts as a diffuser. The flow passages 266 may be configured so as to have similar or equal diffusion ratios. The flow passages 266 may be configured so as to have similar or equal diffusion rates as defined above.

Figure 7:
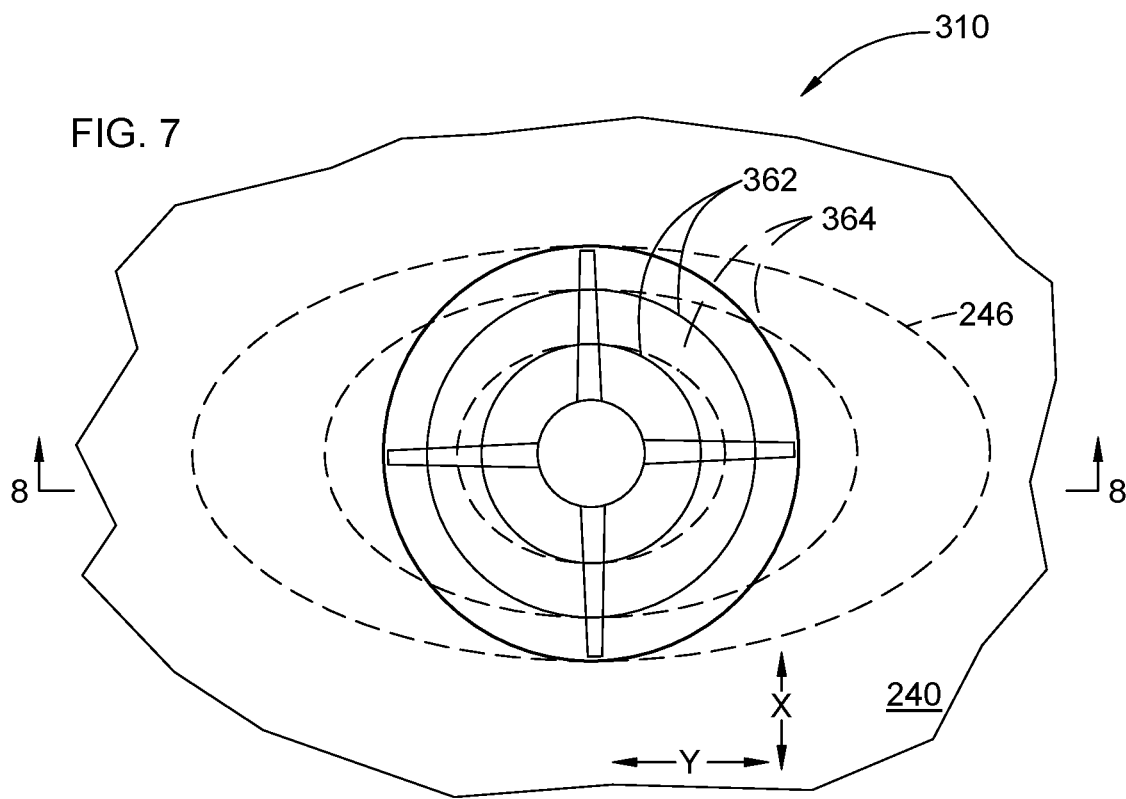
FIG. 7 is a schematic top land view of an alternative lift fan.
Figure 8:
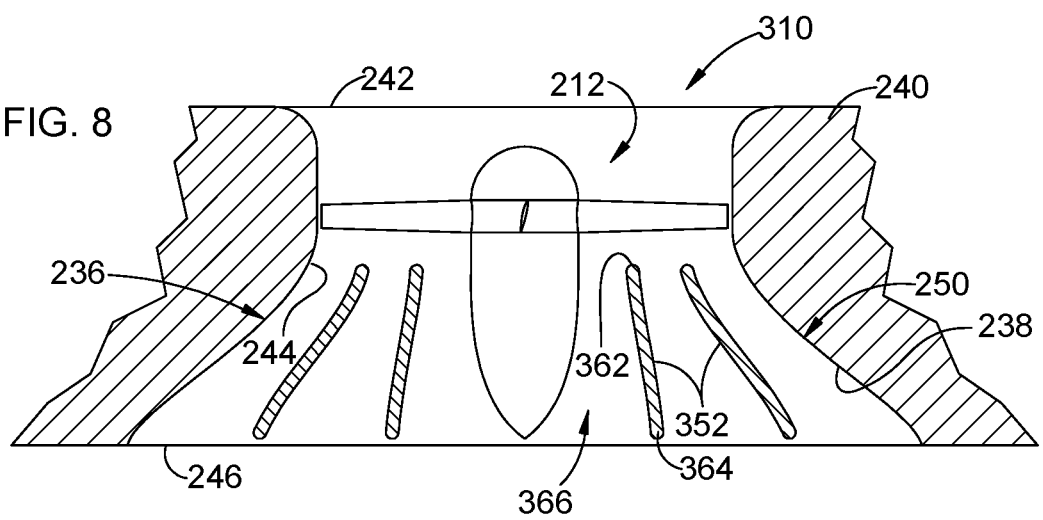
FIG. 8 is a cross-sectional view taken along lines 8-8 of FIG. 7.

FIGS. 7 and 8 depict an alternative lift fan 310 which is a variation of the lift fan 210 shown in FIGS. 5 and 6 and has an identical rotor 212 and duct 236, with peripheral wall surfaces 238 defining an inlet 242, a mid-section 244, and an exit 246, and a diffuser 250.

The duct 236 incorporates splitters 352 in the diffuser 250. Each of the splitters 352 has opposed side walls extending between a leading edge 362 and a trailing edge 364. The splitters 352 are generally annular and subdivide the duct 236 into a plurality of generally parallel, generally annular flow passages 366. In the illustrated example, one or more of the individual splitters 352 has an elliptical shape which transitions or "morphs" from a circular shape at the leading edge 362, to an elliptical or otherwise elongated shape having a longer dimension (i.e. major axis) parallel to a direction "Y" at the trailing edge 364. For simplicity of illustration, only the leading and trailing edges of the splitters 352 are depicted in FIG. 7.

The splitters 362 are configured such that each flow passage 366 acts as a diffuser. The flow passages 366 may be configured so as to have similar or equal diffusion ratios. The fib w passages 366 may be configured so as to have similar or equal diffusion rates as defined above.

The apparatus described herein has several advantages over the prior art. The presence of the diffuser downstream of a lift fan rotor allows for more air (i.e. mass/volume flow) to be drawn through a given fan diameter and hence the hover efficiency increased.

The flow length of the diffuser can be significantly shortened by adding splitters and this can also reduce surface friction losses. The splitters can help unload the outer duct wall and move the aerodynamic loading to the vanes that can operate in cleaner air.

The foregoing has described a lift fan. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

What is claimed is:

1. A lift fan apparatus, comprising:
a rotor having at least one rotatable hub carrying at least one row of blades;
a duct surrounding the rotor, the duct including spaced-apart peripheral walls extending between an inlet and an exit, the peripheral walls collectively defining a flow channel which includes a diffuser disposed downstream of the rotor, in which a flow area at the exit is greater than a flow area at the rotor; and
a plurality of spaced-apart splitters disposed in the diffuser downstream of the rotor and forming annular channels, each of the splitters having opposed side walls extending between an upstream leading edge and a downstream trailing edge, wherein all of the splitters are fully disposed within the flow channel and divide the diffuser into a plurality of side-by-side flow passages, wherein the flow passages have equal diffusion ratios and the flow area of each of the flow passages increases in a downstream direction.

2. The apparatus of claim 1 wherein the splitters are configured to turn a flow passing through the duct in at least one plane.

3. The apparatus of claim 1 wherein a flow area of the duct at the exit is at least 50% greater than a flow area of the duct at the rotor.

4. The apparatus of claim 1 wherein a flow area of the duct at the exit is at least 100% greater than a flow area of the duct at the rotor.

5. The apparatus of claim 1 further comprising a prime mover coupled in driving relationship with the hub.

6. The apparatus of claim 1 wherein the duct includes a mid-section disposed between the inlet and the diffuser, the mid-section being a body of revolution.

7. The apparatus of claim 1 wherein the diffuser includes an upstream portion with a first flow area shape and a downstream portion which has a second flow area shape different from the first flow area shape.

8. The apparatus of claim 7 wherein the first flow area shape is a body of revolution and a downstream portion has an elongated non-axisymmetric flow area shape.

9. The apparatus of claim 7 wherein the downstream portion has a width dimension equal to a radius of the upstream portion, and a length dimension measured perpendicular to the width dimension, wherein the length dimension is greater than the width dimension.

10. The apparatus of claim 1 wherein at least one of the splitters has a first flow area shape at its leading edge and transitions to a second flow area shape at its trailing edge, wherein the second flow area shape is different from the first flow area shape.

11. The apparatus of claim 1 wherein at least one of the splitters includes a moveable component disposed adjacent the trailing edge.

12. The lift fan apparatus of claim 1 wherein the duct exit has an area that is at least 50% larger than the duct inlet.

13. A lift fan apparatus, comprising:
a vehicle structure;
a duct disposed in the vehicle structure, the duct including spaced-apart peripheral walls extending between an inlet and an exit, the peripheral walls collectively defining a flow channel which includes a diffuser communicating with the exit;
a rotor mounted in the duct upstream of the diffuser, the rotor having at least one rotatable hub carrying at least one row of blades;
a prime mover coupled in driving relationship with the hub; and
a plurality of spaced-apart splitters disposed in the diffuser downstream of the rotor and forming annular channels, each of the splitters having opposed side walls extending between an upstream leading edge and a downstream trailing edge, wherein all of the splitters are fully disposed within the flow channel and divide the diffuser into a plurality of side-by-side flow passages, wherein the flow passages have equal diffusion ratios and the flow area of each of the flow passages increases in a downstream direction, and wherein at least one of the spaced-apart splitters includes a moveable portion adjacent the trailing edge.

14. The apparatus of claim 13 wherein a flow area of the duct at the exit is at least 50% greater than a flow area of the duct at the rotor.

15. The apparatus of claim 13 wherein the duct includes a mid-section disposed between the inlet and the diffuser, the mid-section being a body of revolution.

16. The apparatus of claim 13 wherein the diffuser includes an upstream portion with a first flow area shape and a downstream portion with a second flow area shape different from the first flow area shape.

17. The apparatus of claim 13 wherein at least one of the splitters has a first flow area shape at its leading edge and transitions to a second flow area shape at its trailing edge, wherein the second flow area shape is different from the first flow area shape.

18. The lift fan apparatus of claim 13 wherein the duct exit has an area that is at least 50% larger than the duct inlet.

* * * * *